United States Patent
Balachandran et al.

(10) Patent No.: US 10,613,896 B2
(45) Date of Patent: Apr. 7, 2020

(54) PRIORITIZING I/O OPERATIONS

(71) Applicant: International Business Machines Corporation, Armonk, NY (US)

(72) Inventors: Subashini Balachandran, Sunnyvale, CA (US); Lukas Rupprecht, San Jose, CA (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/845,877

(22) Filed: Dec. 18, 2017

(65) Prior Publication Data
US 2019/0188031 A1 Jun. 20, 2019

(51) Int. Cl.
*G06F 9/48* (2006.01)
*G06F 13/372* (2006.01)

(52) U.S. Cl.
CPC .......... *G06F 9/4818* (2013.01); *G06F 13/372* (2013.01)

(58) Field of Classification Search
CPC combination set(s) only.
See application file for complete search history.

(56) References Cited

U.S. PATENT DOCUMENTS

| | | | |
|---|---|---|---|
| 6,157,963 A * | 12/2000 | Courtright, II | G06F 3/061 710/40 |
| 8,473,648 B2 * | 6/2013 | Chakhaiyar | G06F 3/0689 710/264 |
| 8,713,572 B2 | 4/2014 | Chambliss et al. | |
| 8,881,165 B2 | 11/2014 | Chambliss et al. | |
| 8,949,801 B2 | 2/2015 | Andrade et al. | |
| 9,015,434 B2 | 4/2015 | Maeda et al. | |
| 9,235,585 B1 * | 1/2016 | Dutch | G06F 17/3012 |
| 9,367,561 B1 | 6/2016 | Dutch et al. | |
| 9,515,956 B2 | 12/2016 | Hu et al. | |
| 2007/0130387 A1 * | 6/2007 | Moore | G06F 13/20 710/40 |
| 2009/0113438 A1 * | 4/2009 | Barness | H04L 67/325 718/103 |
| 2010/0077107 A1 * | 3/2010 | Lee | G06F 3/0611 710/6 |
| 2010/0262687 A1 | 10/2010 | Shen et al. | |
| 2012/0109895 A1 | 5/2012 | Zwilling et al. | |
| 2013/0007757 A1 | 1/2013 | Chambliss et al. | |
| 2013/0074087 A1 | 3/2013 | Chambliss et al. | |

(Continued)

OTHER PUBLICATIONS

Yan et al. "TR-Spark: Transient Computing for Big Data Analytics," SoCC '16, Oct. 5-7, 2016, pp. 484-496.

(Continued)

*Primary Examiner* — Raymond N Phan
(74) *Attorney, Agent, or Firm* — Zilka-Kotab, P.C.

(57) ABSTRACT

A computer-implemented method according to one embodiment includes identifying an input/output (I/O) operation to be implemented within a distributed computing environment, where the distributed computing environment executes a plurality of different jobs, determining information associated with the I/O operation indicating that the I/O operation is associated with a recovery of one of the plurality of different jobs, and assigning an implementation priority to the I/O operation, based on the information associated with the I/O operation.

20 Claims, 8 Drawing Sheets

(56) References Cited

U.S. PATENT DOCUMENTS

2016/0062795 A1    3/2016  Hu et al.
2018/0285294 A1*   10/2018 Chagam Reddy ...... G06F 13/30

OTHER PUBLICATIONS

Salama, "Cost-based Fault-tolerance for parallel Data Processing," Proceedings of the 2015 ACM Sigmod International Conference on Management of Data, May 31-Jun. 4, 2015, pp. 285-297.
Sharma et al., "Flint: Batch-Interactive Data-Intensive Processing on Transient Servers," EuroSys '16, Apr. 18-21, 2016, pp. 1-15.
NIST, "NIST Cloud Computing Program," Information Technology Laboratory, retrieved from http://www.nist.gov/itl/cloud/, Nov. 2013, pp. 1-2.
Mell et al., "The NIST Definition of Cloud Computing," Version 15, Oct. 2009, pp. 1-2.
Mell et al., "The NIST Definition of Cloud Computing," National Institute of Standards and Technology, Special Publication 800-145, Sep. 2011, pp. 1-7.

* cited by examiner

PRIORITIZING I/O OPERATIONS

BACKGROUND

The present invention relates to distributed data processing, and more specifically, this invention relates to prioritizing recovery-related input/output (I/O) operations for distributed computing jobs.

Distributed computing environments perform valuable data processing on a regular basis. Many different I/O operations are requested and performed within distributed computing environments during their regular operation. However, current I/O operation scheduling fails to account for an importance of particular I/O operations such as checkpointing I/O operations and recovery-related I/O operations when compared to normal workload I/O operations within the distributed computing environment.

SUMMARY

A computer-implemented method according to one embodiment includes identifying an input/output (I/O) operation to be implemented within a distributed computing environment, where the distributed computing environment executes a plurality of different jobs, determining information associated with the I/O operation indicating that the I/O operation is associated with a recovery of one of the plurality of different jobs, and assigning an implementation priority to the I/O operation, based on the information associated with the I/O operation.

According to another embodiment, a computer program product for prioritizing an input/output (I/O) operation comprises a computer readable storage medium having program instructions embodied therewith, where the computer readable storage medium is not a transitory signal per se, and where the program instructions are executable by a processor to cause the processor to perform a method comprising identifying the I/O operation to be implemented within a distributed computing environment, utilizing the processor, where the distributed computing environment executes a plurality of different jobs, determining information associated with the I/O operation indicating that the I/O operation is associated with a recovery of one of the plurality of different jobs, utilizing the processor, and assigning an implementation priority to the I/O operation, based on the information associated with the I/O operation, utilizing the processor.

A system according to another embodiment includes a processor, and logic integrated with the processor, executable by the processor, or integrated with and executable by the processor, where the logic is configured to identify an input/output (I/O) operation to be implemented within a distributed computing environment, where the distributed computing environment executes a plurality of different jobs, determine information associated with the I/O operation indicating that the I/O operation is associated with a recovery of one of the plurality of different jobs, and assign an implementation priority to the I/O operation, based on the information associated with the I/O operation.

Other aspects and embodiments of the present invention will become apparent from the following detailed description, which, when taken in conjunction with the drawings, illustrate by way of example the principles of the invention.

DETAILED DESCRIPTION

Figure 1:
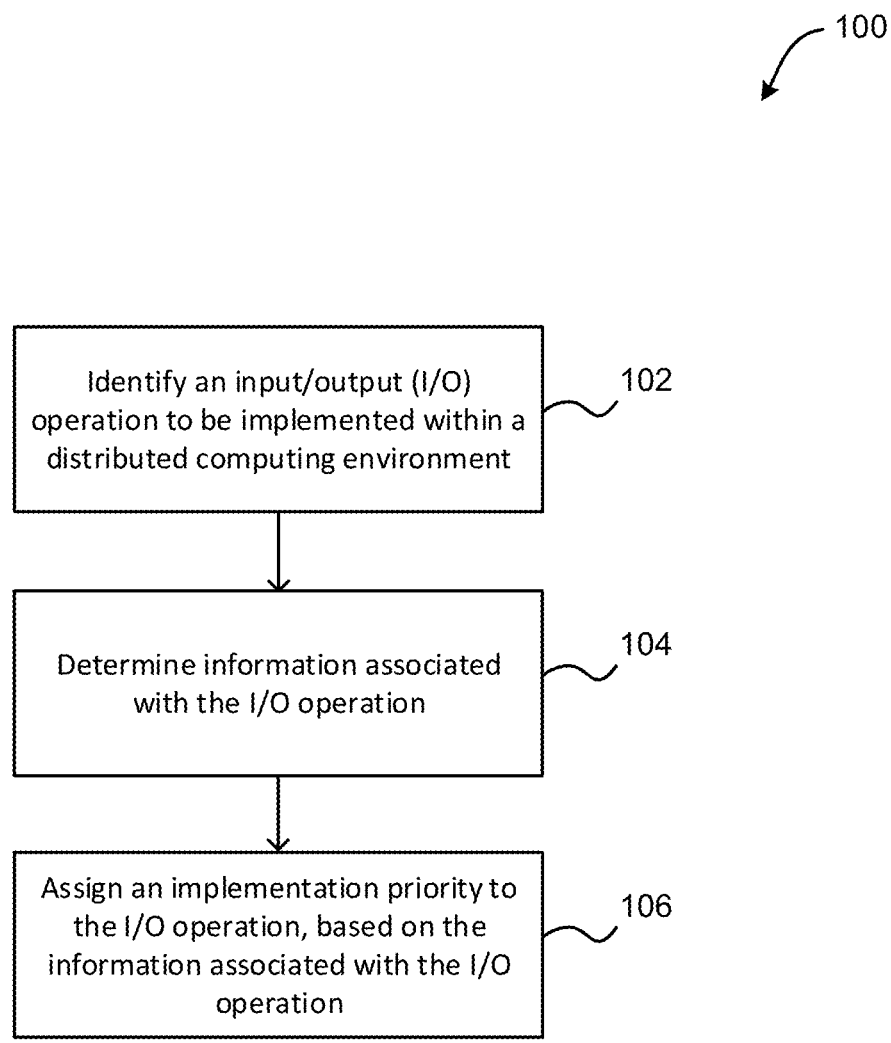
FIG. 1 illustrates a flowchart of a method for prioritizing I/O operations, in accordance with one embodiment.

The following description discloses several preferred embodiments of systems, methods and computer program products for prioritizing I/O operations. Various embodiments provide a method for determining information associated with an I/O operation to be implemented within a system, and assigning a priority to the I/O operation, based on the associated information.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for prioritizing I/O operations.

In one general embodiment, a computer-implemented method includes identifying an input/output (I/O) operation to be implemented within a distributed computing environment, where the distributed computing environment executes a plurality of different jobs, determining information associated with the I/O operation indicating that the I/O operation is associated with a recovery of one of the plurality of different jobs, and assigning an implementation priority to the I/O operation, based on the information associated with the I/O operation.

In another general embodiment, a computer program product for prioritizing an input/output (I/O) operation comprises a computer readable storage medium having program instructions embodied therewith, where the computer readable storage medium is not a transitory signal per se, and where the program instructions are executable by a processor to cause the processor to perform a method comprising identifying the I/O operation to be implemented within a distributed computing environment, utilizing the processor, where the distributed computing environment executes a plurality of different jobs, determining information associated with the I/O operation indicating that the I/O operation is associated with a recovery of one of the plurality of different jobs, utilizing the processor, and assigning an implementation priority to the I/O operation, based on the information associated with the I/O operation, utilizing the processor.

In another general embodiment, a system includes a processor, and logic integrated with the processor, executable by the processor, or integrated with and executable by the processor, where the logic is configured to identify an input/output (I/O) operation to be implemented within a distributed computing environment, where the distributed computing environment executes a plurality of different jobs, determine information associated with the I/O operation indicating that the I/O operation is associated with a recovery of one of the plurality of different jobs, and assign an implementation priority to the I/O operation, based on the information associated with the I/O operation.

Now referring to FIG. 1, a flowchart of a method 100 is shown according to one embodiment. The method 100 may be performed in accordance with the present invention in any of the environments depicted in FIGS. 3 and 5-8, among others, in various embodiments. Of course, more or less operations than those specifically described in FIG. 1 may be included in method 100, as would be understood by one of skill in the art upon reading the present descriptions.

Each of the steps of the method 100 may be performed by any suitable component of the operating environment. For example, in various embodiments, the method 100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 1, method 100 may initiate with operation 102, where an input/output (I/O) operation to be implemented within a distributed computing environment is identified. In one embodiment, the distributed computing environment may include a plurality of different computing devices (e.g., servers, desktop computers, mobile devices, etc.) that work together to perform data processing. For example, the data processing may include workloads known as jobs where a job may include actions such as counting a number of words in one or more documents, compiling weather data over a predetermined time period for a particular date, etc.

Additionally, in one embodiment, a plurality of different jobs may be executed (e.g., run, etc.) simultaneously by the distributed computing environment. In another embodiment, the data processing may be implemented utilizing parallelizing software. In yet another embodiment, the data processing may be implemented utilizing a scheduling application (e.g., Spark™, etc.) that schedules tasks to be performed within a job and assigns those actions to one or more computation (e.g., worker) nodes for implementation.

Further, in one embodiment, the distributed computing environment may utilize a clustered filesystem (e.g., general parallel file system (GPFS), etc.) that provides concurrent access to a single file system or set of file systems from multiple nodes within the distributed computing environment. In another embodiment, the distributed computing environment may include a cloud computing environment.

Further still, in one embodiment, the I/O operation may be associated with a job currently being run within the distributed computing environment. For example, the I/O operation may include a task to be performed within a job being run within the distributed computing environment. In another embodiment, a plurality of jobs may be run simultaneously within the distributed computing environment, and each job may have a plurality of tasks to be performed. In yet another embodiment, some tasks may be performed sequentially, and some tasks may be performed simultaneously.

Also, in one embodiment, the I/O operation may include a data read operation from a data source within the distributed computing environment. For example, the data source may include a data store (e.g., hard disk drive, etc.) within a single node of the distributed computing environment. In another example, the data source may include a distributed storage system (DSS) within the distributed computing environment. For instance, the distributed storage system may include a plurality of different storage devices on a plurality of different nodes within the distributed computing environment.

In addition, in one embodiment, a plurality of different jobs running simultaneously within the distributed computing environment may share the same data source within the distributed computing environment. In another embodiment, the I/O operation may include a data write operation to a data source within the distributed computing environment. In yet another embodiment, implementing the I/O operation may include requesting that the I/O operation be performed. For example, a computation node within the distributed storage system may send the I/O operation to a data source, and may ask that the I/O operation be performed at the data source.

Further, method 100 may proceed with operation 104, where information associated with the I/O operation is determined. In one embodiment, the information may include a type of the I/O operation. For example, it may be determined whether the I/O operation is a read operation or a write operation. In another embodiment, the information may include a job associated with the I/O operation. For example, the I/O operation may be implemented as part of a predetermined job being run within the distributed computing environment.

Further still, in one embodiment, the information may include a stage within the job that is associated with the I/O operation. For example, each job may be divided into a plurality of different stages, where different tasks are performed during each stage when the job is run within the distributed computing environment. In another example, the I/O operation may be implemented during a predetermined stage of the job when the job is run within the distributed computing environment.

Also, in one embodiment, the information may include a class of the I/O operation. For example, the I/O operations may be grouped into a plurality of different classes, where each class is associated with one or more actions performed by that group of I/O operations.

In another embodiment, one class may identify the I/O operation as performing a recovery-related read. For example, in response to determining that a job has failed within the distributed computing environment, recovery operations may be initiated to recover from a previously checkpointed location. These recovery operations may include identifying a most recent checkpoint that was saved for the job, retrieving snapshot data for the job that is associated with the most recent checkpoint, and recovering the job, utilizing the snapshot data. The recovery operations may also include populating all snapshot data in local memory. In another embodiment, I/O operations that perform recovery-related reads may include reads that retrieve checkpoint and snapshot data during recovery operations.

Additionally, in one embodiment, another class may identify the I/O operation as performing a standard job read or write. For example, standard job reads and writes may include predetermined reads and writes that are implemented during the completion of a job within the distributed computing environment. In another example, standard job reads and writes may not include I/O operations associated with job recovery, job snapshot checkpointing, etc. When a job is run, data may be retrieved from one or more data sources, and may be sent to one or more computation nodes, where one or more actions may be performed on the retrieved data. This may result in updated data, which may then be sent from the computation nodes back to the data sources for storage. In another embodiment, I/O operations that perform regular job reads and writes may include reads and writes performed during this data retrieval, updating, and storage.

Further, in one embodiment, I/O operations that perform regular job reads and writes may also include I/O operations that occur during spill over operations. For example, when a computation node runs out of resources, intermediate results may be written onto a disk, and may be read from the disk. In another embodiment, I/O operations that perform regular job reads and writes may include these reads and writes.

Further still, in one embodiment, another class may identify the I/O operation as being associated with restarting a suspended job. For example, in response to determining that too many jobs are being run on a computation node, a job may be suspended (e.g., paused, etc.) within that node. Resources associated with the suspended job may be evicted (e.g., moved from the node to a checkpoint, etc.). In response to determining that the suspended job is to be resumed, these evicted resources may be reloaded on the node from the checkpoint. In another embodiment, I/O operations associated with restarting a suspended job may include read operations made for these evicted resources in order to reload the resources during the resuming of a suspended job.

Also, in one embodiment, another class may identify the I/O operation as performing a checkpoint write. For example, snapshots including a state of a job and operations within a node may be periodically written to a data source within the distributed computing environment. These write operations may be performed according to a predetermined schedule. In another embodiment, I/O operations that perform checkpoint writes may include these write operations.

In addition, in one embodiment, the information may include a location of the I/O operation within a checkpoint.

In addition, method 100 may proceed with operation 106, where an implementation priority is assigned to the I/O operation, based on the information associated with the I/O operation. In one embodiment, assigning the implementation priority may include comparing the information associated with the I/O operation to a predetermined policy. For example, the predetermined policy may include a quality of service (QoS) control policy having a predetermined mapping between information associated with the I/O operation and a priority for the I/O operation.

Further still, in one embodiment, the implementation priority may include a numerical value. For example, a lower numerical value may be assigned a higher implementation priority than a higher numerical value. In another embodiment, an I/O operation having a first type may be assigned a higher implementation priority than an I/O operation having a second type. For example, read operations may be assigned a higher implementation priority than write operations.

Also, in one embodiment, an I/O operation associated with a first job may be assigned a higher implementation priority than an I/O operation associated with a second job. For example, an I/O operation implemented within a word counting job may be assigned a lower priority than an I/O operation implemented within a climate calculation job. In another embodiment, an I/O operation associated with a first stage within a job may be assigned a higher implementation priority than an I/O operation associated with a second stage within the job.

For example, stages within a job may be prioritized based on their location within the job pipeline. For instance, later stages within a job pipeline may be assigned a higher implementation priority than earlier stages within the job pipeline. In another example, stages may be prioritized based on how expensive the operations are within each stage. For instance, a first stage may perform 80% of the total operations within a job, and a second stage may perform 10% of the total operations within the job. As a result, an I/O operation implemented within the first stage may be assigned a higher implementation priority than an I/O operation implemented with the second stage.

Additionally, in one embodiment, an I/O operation within a first class may be assigned a higher implementation priority than an I/O operation within a second class. For example, an I/O operation identified as performing a recovery-related read may be assigned a higher implementation priority than an I/O operation identified as performing a standard job read or write. In another embodiment, an I/O operation at a first location within a checkpoint may be assigned a higher implementation priority than an I/O operation at a second location within a checkpoint (e.g., the second location may be earlier within the checkpoint than the first location).

Further, in one embodiment, the implementation priority may be associated with the I/O operation. For example, the implementation priority may be sent with the I/O operation to a data source for implementation. In another embodiment, the I/O operation may be executed within the distributed computing environment, according to the implementation priority assigned to the I/O operation. For example, the I/O operation may be executed at the data source, according to the associated implementation priority. In another example, a plurality of I/O operations may be received at the data source, and the data source may execute an I/O operation having a higher implementation priority before an I/O operation having a lower priority.

Further still, in one embodiment, one or more resources within the distributed computing environment may be allocated to the I/O operation, according to the implementation priority assigned to the I/O operation. For example, a first amount of bandwidth (e.g., processing bandwidth, network bandwidth, etc.) may be given to an I/O operation with a first priority, and a second amount of bandwidth may be given to an I/O operation with a second priority. In another example, the first amount of bandwidth may be greater than the second amount of bandwidth when the first priority is higher than the second priority. In this way, the implementation priority may dictate an order in which the I/O operation is performed within the distributed computing environment.

Also, in one embodiment, an unlimited amount of bandwidth may be given to an I/O operation with a highest priority, unused bandwidth left over may be given to an I/O operation with a second highest priority, etc. In another embodiment, a minimum amount of bandwidth may be reserved for each I/O operation, regardless of priority. In this way, the implementation priority may dictate an amount of bandwidth provided to the I/O operation within the distributed computing environment.

In this way, I/O operations may be prioritized within the distributed computing environment. This may minimize delays in restoring failed jobs from checkpoints, may minimize job completion times within the distributed computing environment, may reduce an amount of power usage and processing resource usage within the distributed computing environment (e.g., by avoiding data transfers associated with unnecessary paused/suspended jobs, etc.), etc.

Figure 2:
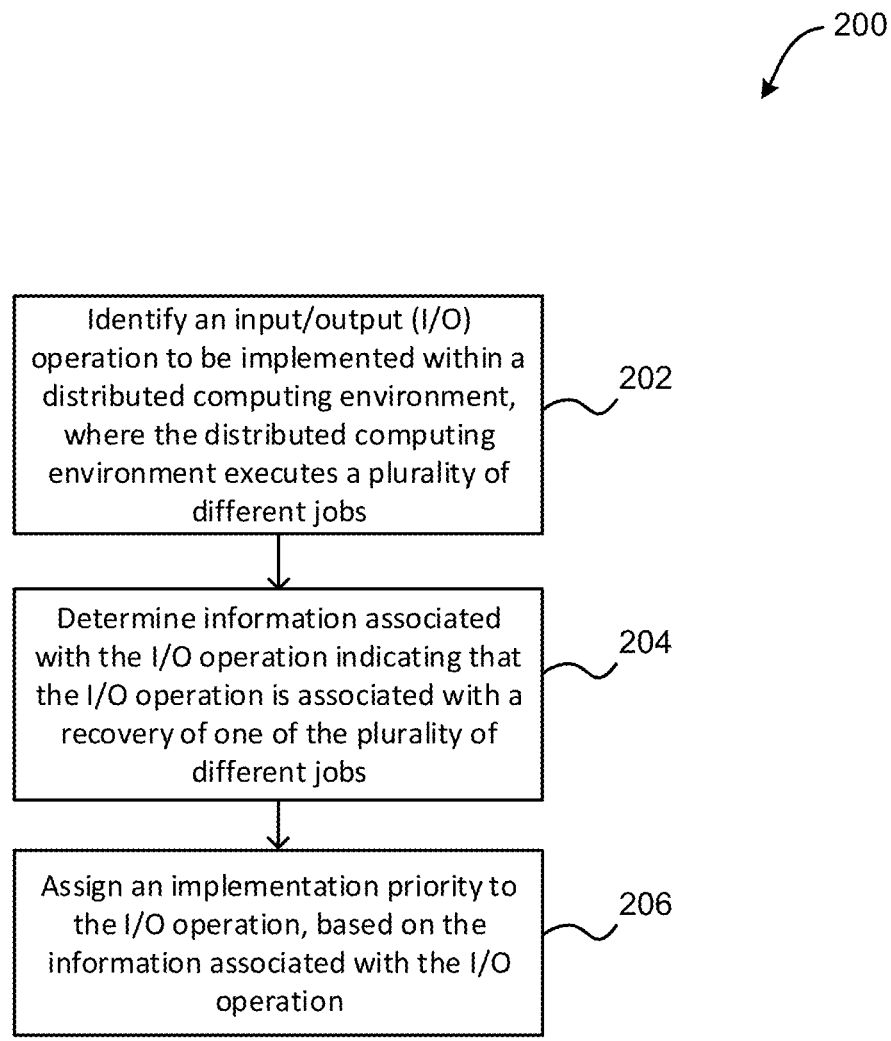
FIG. 2 illustrates a flowchart of a method for prioritizing recovery-related I/O operations, in accordance with one embodiment.

Now referring to FIG. 2, a flowchart of a method 200 for prioritizing recovery-related I/O operations is shown according to one embodiment. The method 200 may be performed in accordance with the present invention in any of the environments depicted in FIGS. 3 and 5-8, among others, in various embodiments. Of course, more or less operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, method 200 may initiate with operation 202, where an input/output (I/O) operation to be implemented within a distributed computing environment is identified, where the distributed computing environment executes a plurality of different jobs. Additionally, method 200 may proceed with operation 204, where information associated with the I/O operation is determined, where the information indicates that the I/O operation is associated with a recovery of one of the plurality of different jobs. Further, method 200 may proceed with operation 206, where an implementation priority is assigned to the I/O operation, based on the information associated with the I/O operation.

In one embodiment, an implementation priority assigned to the I/O operation may be higher than another implementation priority assigned to another I/O operation associated with a standard job operation.

Figure 3:
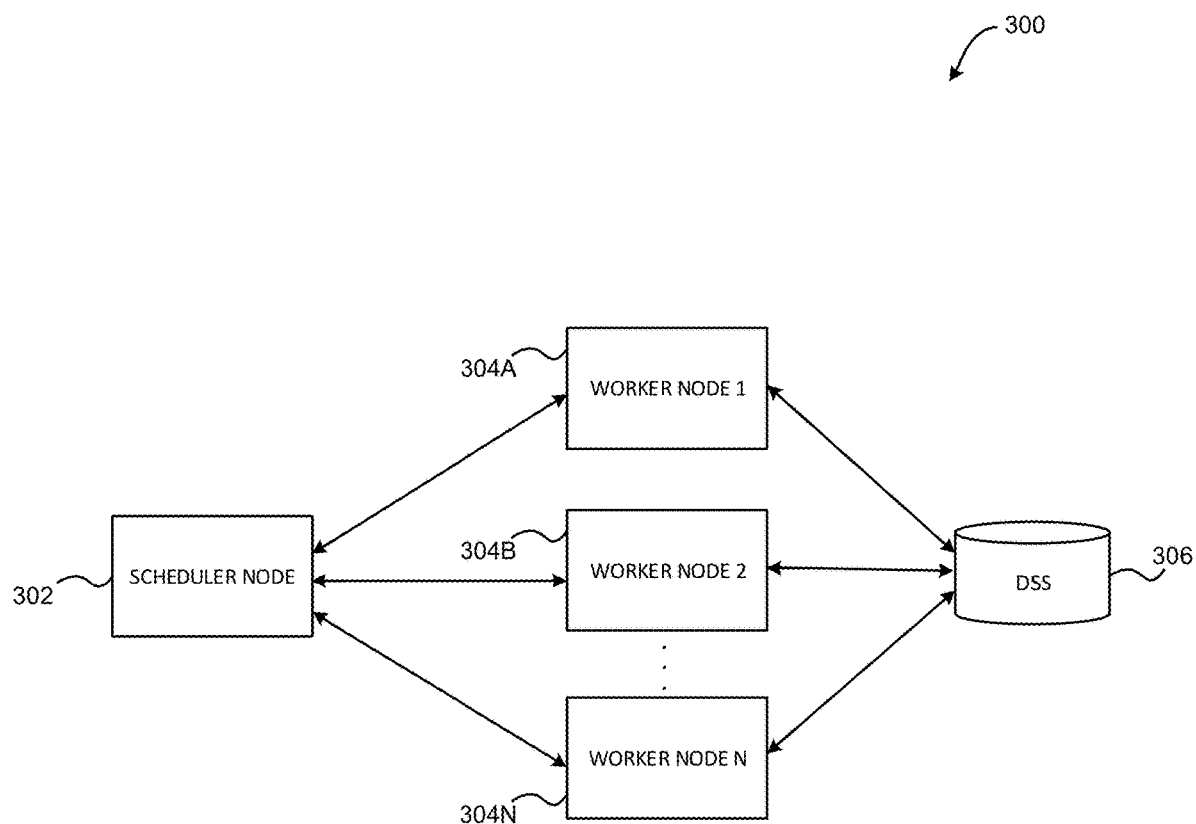
FIG. 3 illustrates an exemplary distributed computing environment, in accordance with one embodiment.

FIG. 3 illustrates an exemplary distributed computing environment 300, according to one embodiment. As shown in FIG. 3, the exemplary distributed computing environment 300 includes a scheduler node 302 in communication with worker nodes 304A-N. Additionally, each of the worker nodes 304A-N is in communication with a shared distributed storage system (DSS) 306. In one embodiment, the scheduler node 302 may identify a job to be implemented within the distributed computing environment 300, and may create a plurality of stages for the identified job.

For example, the scheduler node 302 may create a job graph (e.g., a job data structure such as a directed acyclic graph (DAG), etc.) based on the identified job, where the job graph indicates actions (e.g., including I/O operations, etc.) to be performed within the job. In another example, the scheduler node 302 may create a plurality of stages associated with the job graph. Additionally, in one embodiment, the scheduler node 302 may distribute the job graph to each of the worker nodes 304A-N. In another embodiment, the scheduler node 302 may also distribute the plurality of stages associated with the job graph to each of the worker nodes 304A-N. For example, the plurality of stages may be passed with the job graph to each of the worker nodes 304A-N. In another example, the plurality of stages may be passed as annotations within the job graph to each of the worker nodes 304A-N. In this way, each of the worker nodes 304A-N may be informed about all I/O operations to be performed within the job, as well as all stages associated with the job.

Further, in one embodiment, each of the worker nodes 304A-N may determine an I/O operation to be performed utilizing that node. For example, each of the worker nodes 304A-N may identify an I/O operation within the job graph that the node needs to request. In another example, the job may include a plurality of different I/O operations that are distributed among the worker nodes 304A-N, such that each of the worker nodes 304A-N requests a different I/O operation than the other worker nodes 304A-N. In another embodiment, each of the worker nodes 304A-N may determine an implementation priority associated with the I/O operation to be performed.

For example, each of the worker nodes 304A-N may have a QoS control policy. In one embodiment, the QoS control policy may be sent from the scheduler node 302 to each of the worker nodes 304A-N. In another embodiment, each of the worker nodes 304A-N may determine information associated with the I/O operation to be performed utilizing that node. For example, each of the worker nodes 304A-N may identify one or more of a type of the I/O operation, a job associated with the I/O operation, a stage within the job that is associated with the I/O operation, a class of the I/O operation, etc.

Further still, in one embodiment, each of the worker nodes 304A-N may compare the information associated with the associated I/O operation to the QoS control policy in order to determine an implementation priority associated with the I/O operation.

Also, in one embodiment, each of the worker nodes 304A-N may send a request to perform the associated I/O operation to the DSS 306. In another embodiment, each of the worker nodes 304A-N may also send to the DSS 306 the implementation priority associated with the I/O operation with the request to perform the associated I/O operation. For example, the implementation priority may be sent to the DSS 306 as a parameter.

As a result, the DSS 306 may receive from the worker nodes 304A-N a plurality of different I/O operation requests, where each request has an associated implementation priority. In one embodiment, the DSS 306 may implement the I/O operations according to their associated priorities. For example, the DSS 306 may perform an I/O operation with a higher implementation priority before performing an I/O operation with a lower priority. For instance, if the I/O operation is a read operation, the DSS 306 may perform the requested read and return the read data to the requesting worker node, where it is staged in memory (e.g., for the worker node to process, etc.). If the I/O operation is a write operation, the DSS 306 may perform the requested write and return a confirmation of such write to the requesting worker node.

In another example, if the DSS 306 receives a first I/O operation having an implementation priority of 5 from a first worker node 304A, and the DSS 306 also receives a second I/O operation having an implementation priority of 2 from a second worker node 304B, the DSS 306 may perform the second I/O operation before the first I/O operation.

In this way, the QoS control policy may control an order in which I/O operations are performed within the distributed computing environment 300. This may enable the prioritization of high-value I/O operations before lower-value I/O operations, which may reduce job processing and completion time, reduce restart time after job failure, increase an accuracy of job completion time estimates, etc.

Figure 4:
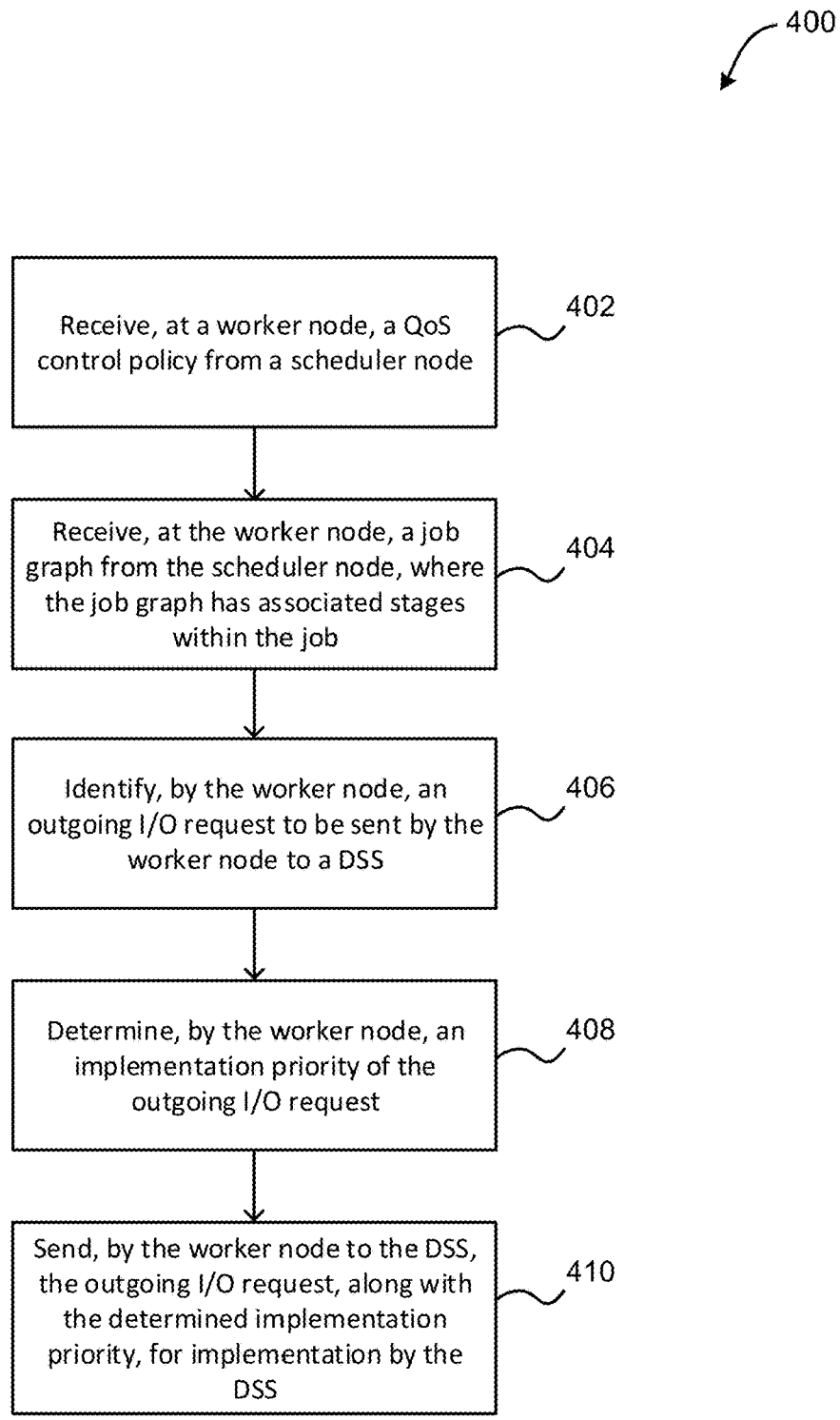
FIG. 4 illustrates a flowchart of a method for determining an implementation priority for an outgoing I/O request, in accordance with one embodiment.

Now referring to FIG. 4, a flowchart of a method 400 for determining an implementation priority for an outgoing I/O request is shown, according to one embodiment. The method 400 may be performed in accordance with the present invention in any of the environments depicted in FIGS. 3 and 5-8, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a worker node receives a QoS control policy from a scheduler node. In one embodiment, the worker node may be one of a plurality of worker nodes within a distributed computing environment. In another embodiment, the QoS control policy may include a mapping between a predetermined classification for an I/O operation and a predetermined implementation priority. In yet another embodiment, the QoS control policy may identify a priority of various I/O operations based on information associated with the I/O operations.

Table 1 illustrates an exemplary QoS control policy, in accordance with one embodiment. Of course, it should be noted that the exemplary QoS control policy shown in Table 1 is set forth for illustrative purposes only, and thus should not be construed as limiting in any manner.

TABLE 1

| Implementation Priority | Classification |
|---|---|
| 1 | Job A stage 2, recovery checkpoint read |
| 2 | Job A stage 1, recovery checkpoint read |

TABLE 1-continued

| Implementation Priority | Classification |
|---|---|
| 3 | Job B stage 2, recovery checkpoint read |
| 4 | Job B stage 1, recovery checkpoint read |
| 5 | Job A regular I/O |
| 6 | Job B regular I/O |
| 7 | Job A stage 2, resume checkpoint read |
| 8 | Job A stage 1, resume checkpoint read |
| 9 | Job B, stage 2, resume checkpoint read |
| 10 | Job B stage 1, resume checkpoint read |
| 11 | Job A checkpoint write |
| 12 | Job B checkpoint write |

Additionally, in one embodiment, each individual I/O operation may be grouped into one of a plurality of predetermined classes. Table 2 illustrates exemplary I/O operation classes, in accordance with one embodiment. Of course, it should be noted that the exemplary classes shown in Table 2 is set forth for illustrative purposes only, and thus should not be construed as limiting in any manner.

TABLE 2

| Class Number/Name | Description of Class |
|---|---|
| Class 1: Recovery related read I/Os from any Job | Read request for Jobs recovering from a previous stashed away checkpoint Higher priority jobs have priority over lower priority jobs For jobs of the same priority, a later job stage has priority over an earlier job stage |
| Class 2: Regular Job I/Os (input/output/spilling) | Higher priority jobs have priority over lower priority jobs |
| Class 3: Resumed read I/Os (suspend-restart from a checkpoint) | Read request for Jobs resuming from a previous stashed away checkpoint Higher priority jobs have priority over lower priority jobs For jobs of the same priority, a later job stage has priority over an earlier job stage |
| Class 4: checkpoint write I/Os | Higher priority jobs have priority over lower priority jobs For jobs of the same priority, larger checkpoints have priority over smaller checkpoints |

Additionally, method 400 may proceed with operation 404, where the worker node receives a job graph from the scheduler node, where the job graph has associated stages within the job. Further, method 400 may proceed with operation 406, where the worker node identifies an outgoing I/O request to be sent by the worker node to a DSS. In one embodiment, the worker node may be instructed to send the I/O request to the DSS according to the job graph (e.g., as part of processing the job within the distributed computing environment, etc.).

Further still, method 400 may proceed with operation 408, where the worker node determines an implementation priority of the outgoing I/O request. In one embodiment, the worker node may determine a classification of the outgoing I/O request (e.g., utilizing one or more of a type of the I/O operation, a job associated with the I/O operation, a stage within the job that is associated with the I/O operation, a class of the I/O operation, a location of the I/O operation within a checkpoint, etc.). In another embodiment, the worker node may compare the classification of the outgoing I/O request to a QoS control policy in order to find a matching classification and associated implementation priority.

Also, method 400 may proceed with operation 410, where the worker node sends the outgoing I/O request to the DSS, along with the determined implementation priority, for implementation by the DSS. In one embodiment, the DSS may execute received I/O requests according to their associated implementation priority.

In this way, a quality of service given to I/O operations within distributed computing jobs may be implemented.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
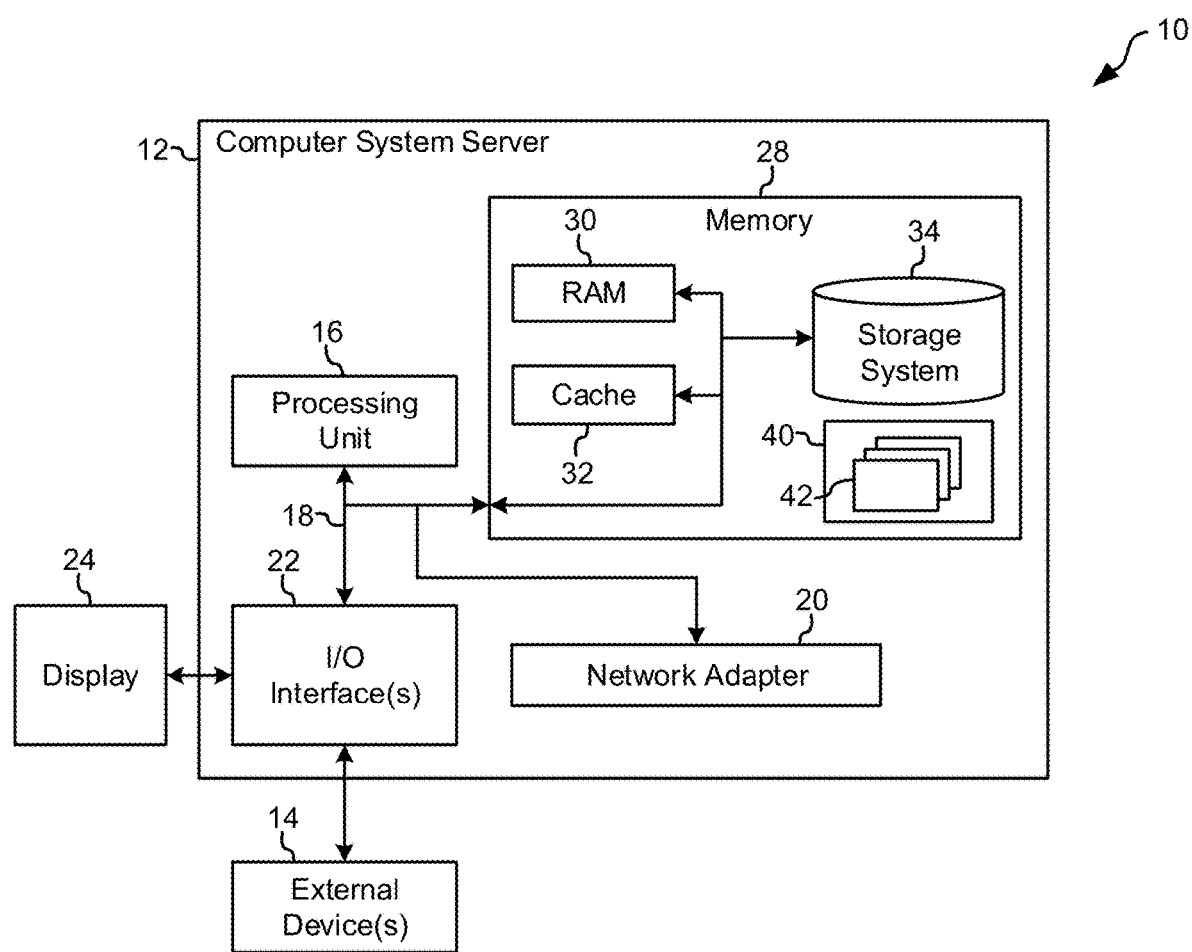
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
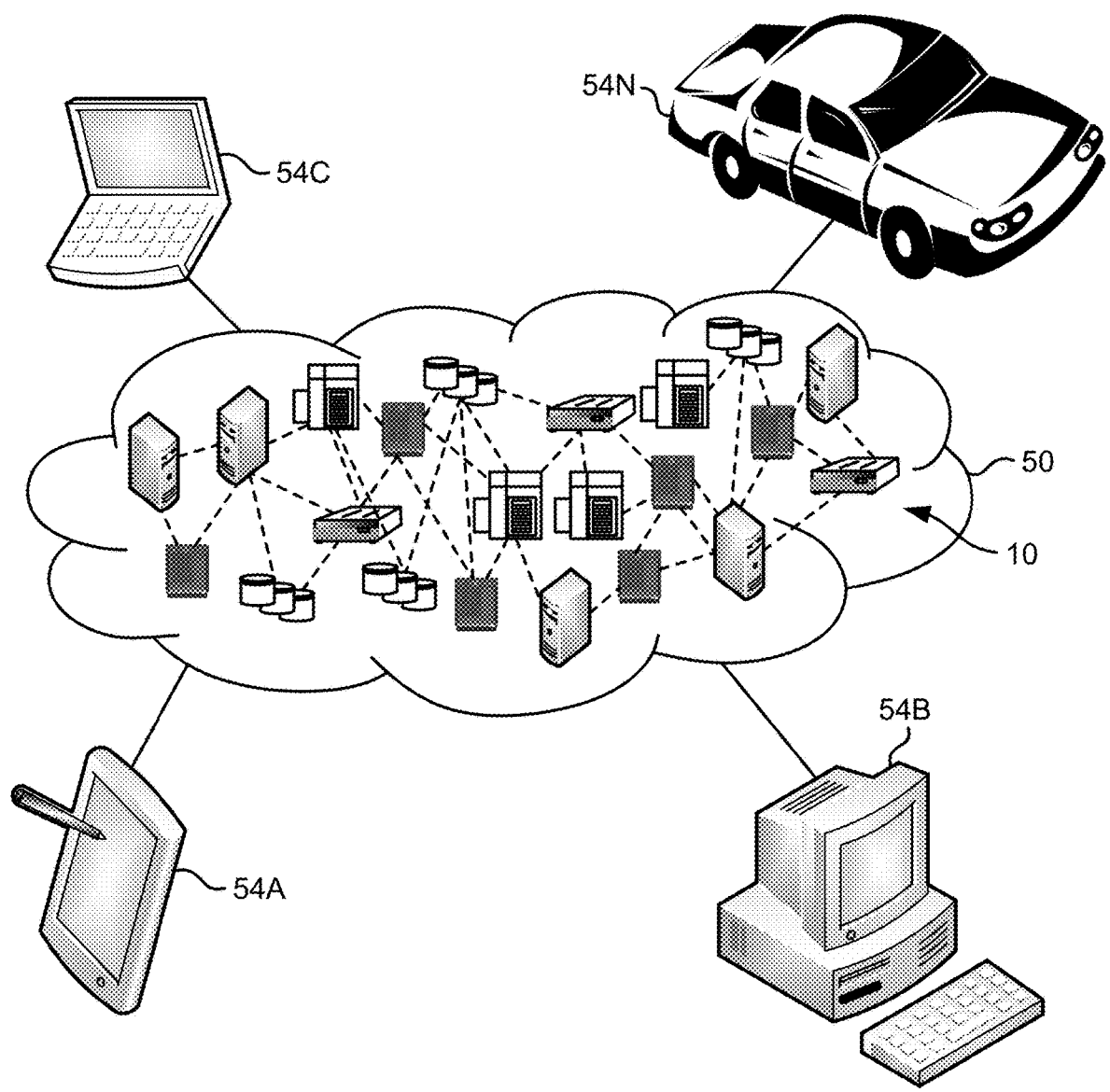
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 7:
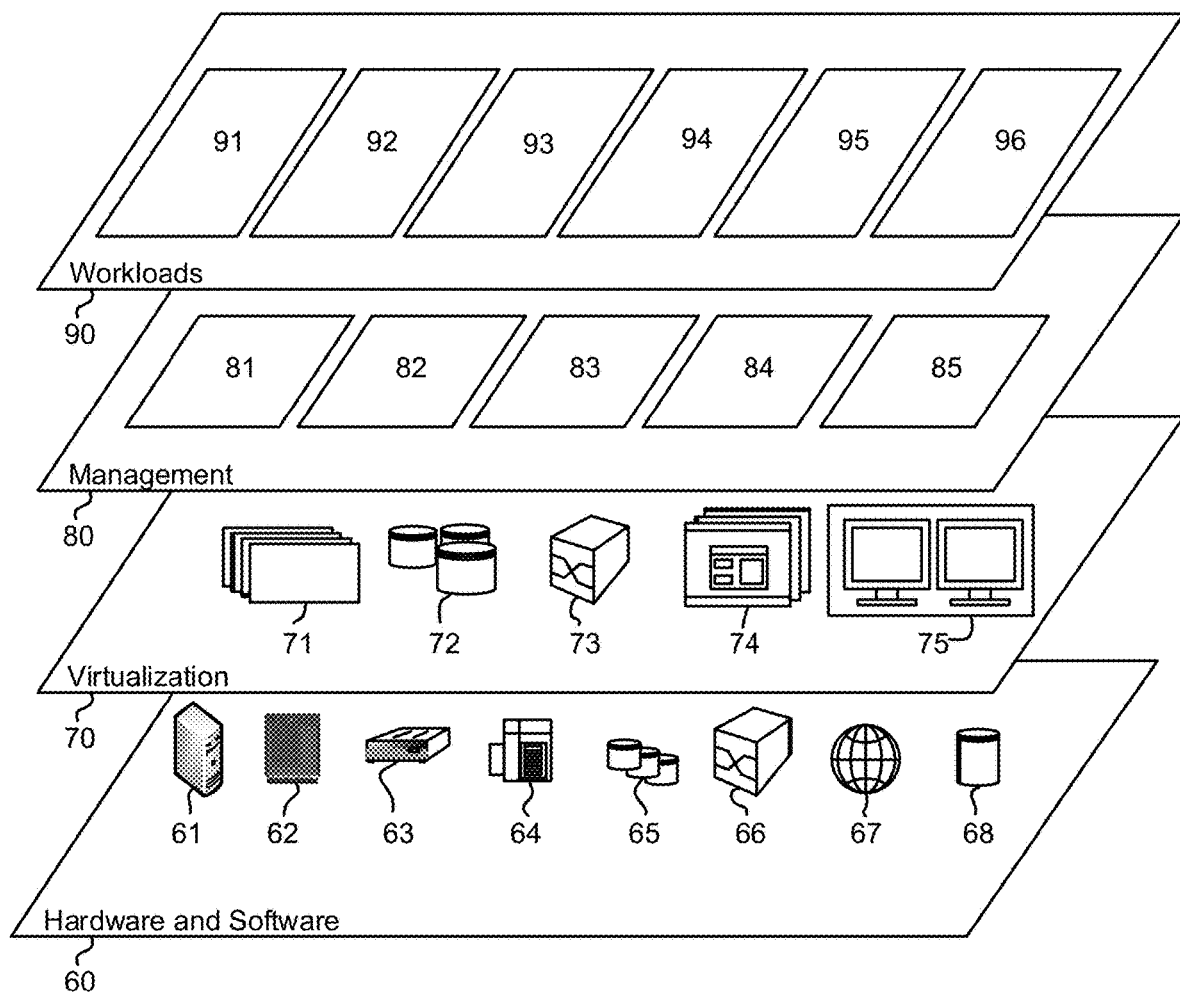
FIG. 7 depicts abstraction model layers according to an embodiment of the present invention.

Referring now to FIG. 7, a set of functional abstraction layers provided by cloud computing environment 50 (FIG. 9) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 8:
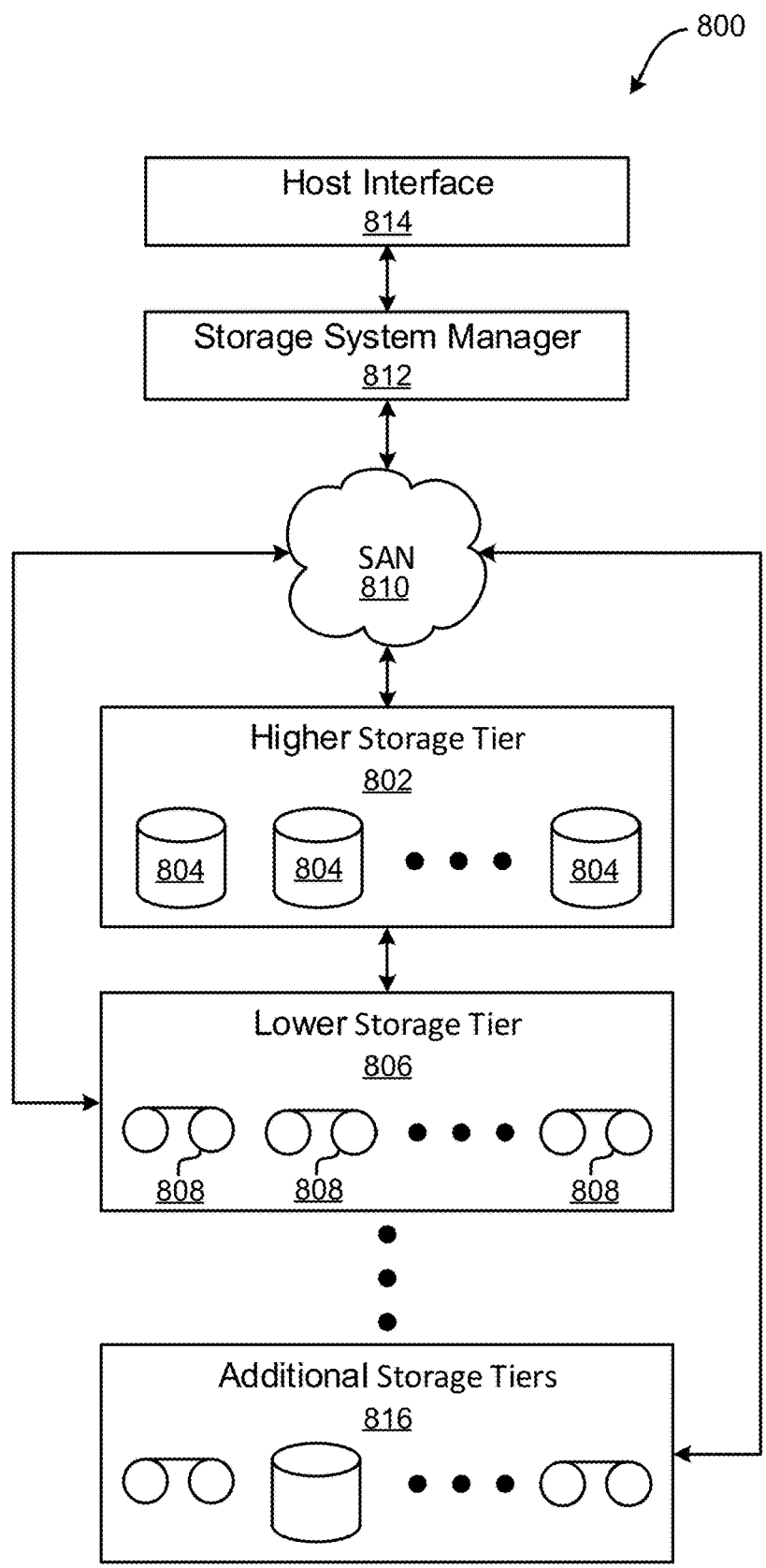
FIG. 8 illustrates a tiered data storage system in accordance with one embodiment.

Now referring to FIG. 8, a storage system 800 is shown according to one embodiment. Note that some of the elements shown in FIG. 8 may be implemented as hardware and/or software, according to various embodiments. The storage system 800 may include a storage system manager 812 for communicating with a plurality of media on at least one higher storage tier 802 and at least one lower storage tier 806. The higher storage tier(s) 802 preferably may include one or more random access and/or direct access media 804, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 806 may preferably include one or more lower performing storage media 808, including sequential access media such as magnetic tape in tape drives and/or optical media, slower accessing HDDs, slower accessing SSDs, etc., and/or others noted herein or known in the art. One or more additional storage tiers 816 may include any combination of storage memory media as desired by a designer of the system 800. Also, any of the higher storage tiers 802 and/or the lower storage tiers 806 may include some combination of storage devices and/or storage media.

The storage system manager 812 may communicate with the storage media 804, 808 on the higher storage tier(s) 802 and lower storage tier(s) 806 through a network 810, such as a storage area network (SAN), as shown in FIG. 8, or some other suitable network type. The storage system manager 812 may also communicate with one or more host systems (not shown) through a host interface 814, which may or may not be a part of the storage system manager 812. The storage system manager 812 and/or any other component of the storage system 800 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 800 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 802, may include a majority of SSD storage media for storing data in a higher performing storage environment, and remaining storage tiers, including lower storage tier 806 and additional storage tiers 816 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 802, while data not having one of these attributes may be stored to the additional storage tiers 816, including lower storage tier 806. Of course, one of skill in the art, upon reading the present descriptions, may devise many other combinations of storage media types to implement into different storage schemes, according to the embodiments presented herein.

According to some embodiments, the storage system (such as 800) may include logic configured to receive a request to open a data set, logic configured to determine if the requested data set is stored to a lower storage tier 806 of a tiered data storage system 800 in multiple associated portions, logic configured to move each associated portion of the requested data set to a higher storage tier 802 of the tiered data storage system 800, and logic configured to assemble the requested data set on the higher storage tier 802 of the tiered data storage system 800 from the associated portions.

Of course, this logic may be implemented as a method on any device and/or system or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying an input/output (I/O) operation to be implemented within a distributed computing environment, where the distributed computing environment executes a plurality of different jobs;
    determining information associated with the I/O operation indicating that the I/O operation is associated with a recovery of one of the plurality of different jobs; and
    assigning an implementation priority to the I/O operation, based on the information associated with the I/O operation.

2. The computer-implemented method of claim 1, wherein the information includes a job associated with the I/O operation.

3. The computer-implemented method of claim 1, wherein the information includes one of a plurality of stages within a job that is associated with the I/O operation.

4. The computer-implemented method of claim 1, wherein the information includes a location of the I/O operation within a checkpoint.

5. The computer-implemented method of claim 1, wherein assigning the implementation priority includes comparing the information associated with the I/O operation to a quality of service (QoS) control policy having a predetermined mapping between the information associated with the I/O operation and a priority for the I/O operation.

6. The computer-implemented method of claim 1, wherein the implementation priority is passed with the I/O operation to a data source for implementation.

7. The computer-implemented method of claim 1, wherein the implementation priority dictates an order in which the I/O operation is performed within the distributed computing environment.

8. The computer-implemented method of claim 1, wherein the implementation priority dictates an amount of bandwidth provided to the I/O operation within the distributed computing environment.

9. The computer-implemented method of claim 1, wherein one or more resources within the distributed computing environment are allocated to the I/O operation, according to the implementation priority assigned to the I/O operation.

10. The computer-implemented method of claim 1, wherein a first amount of bandwidth is given to a first I/O operation with a first priority, and a second amount of bandwidth is given to a second I/O operation with a second priority, where the first amount of bandwidth is greater than the second amount of bandwidth in response to determining that the first priority is higher than the second priority.

11. The computer-implemented method of claim 1, wherein the information includes a class of the I/O operation, where the class is associated with one or more actions performed by the I/O operation.

12. The computer-implemented method of claim 1, wherein an implementation priority associated with a recovery-related read is higher than an implementation priority associated with a standard job read or write.

13. The computer-implemented method of claim 11, wherein the class identifies the I/O operation as performing a recovery-related read.

14. The computer-implemented method of claim 11, wherein the class identifies the I/O operation as performing a standard job read or write.

15. The computer-implemented method of claim 11, wherein the class identifies the I/O operation as being associated with restarting a suspended job.

16. The computer-implemented method of claim 11, wherein the class identifies the I/O operation as performing a checkpoint write.

17. A computer program product for prioritizing an input/output (I/O) operation, the computer program product comprising a computer readable storage medium having program instructions embodied therewith, wherein the computer readable storage medium is not a transitory signal per se, the program instructions executable by a processor to cause the processor to perform a method comprising:
identifying the I/O operation to be implemented within a distributed computing environment, utilizing the processor, where the distributed computing environment executes a plurality of different jobs;
determining information associated with the I/O operation indicating that the I/O operation is associated with a recovery of one of the plurality of different jobs, utilizing the processor; and
assigning an implementation priority to the I/O operation, based on the information associated with the I/O operation, utilizing the processor.

18. The computer program product of claim 17, wherein assigning the implementation priority includes comparing the information associated with the I/O operation to a quality of service (QoS) control policy having a predetermined mapping between the information associated with the I/O operation and a priority for the I/O operation, utilizing the processor.

19. The computer program product of claim 17, wherein one or more resources within the distributed computing environment are allocated to the I/O operation, according to the implementation priority assigned to the I/O operation.

20. A system, comprising:
a processor; and
logic integrated with the processor, executable by the processor, or integrated with and executable by the processor, the logic being configured to:
identify an input/output (I/O) operation to be implemented within a distributed computing environment, where the distributed computing environment executes a plurality of different jobs;
determine information associated with the I/O operation indicating that the I/O operation is associated with a recovery of one of the plurality of different jobs; and
assign an implementation priority to the I/O operation, based on the information associated with the I/O operation.

* * * * *